(12) United States Patent
Bak et al.

(10) Patent No.: US 10,127,668 B2
(45) Date of Patent: Nov. 13, 2018

(54) SYSTEMS AND METHODS FOR RE-IDENTIFYING OBJECTS IN IMAGES

(71) Applicant: Disney Enterprises, Inc., Burbank, CA (US)

(72) Inventors: Slawomir W. Bak, Pittsburgh, PA (US); George Peter Carr, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 307 days.

(21) Appl. No.: 15/061,784

(22) Filed: Mar. 4, 2016

(65) Prior Publication Data

US 2017/0256057 A1     Sep. 7, 2017

(51) Int. Cl.
*G06K 9/00* (2006.01)
*G06T 7/00* (2017.01)

(52) U.S. Cl.
CPC .. *G06T 7/0044* (2013.01); *G06T 2207/20221* (2013.01); *G06T 2207/30196* (2013.01)

(58) Field of Classification Search
CPC ........ G06T 2207/20021; G06K 9/4671; G06K 9/4676; G06K 2009/6213; G06K 9/00288; G06K 9/621
See application file for complete search history.

(56) References Cited

U.S. PATENT DOCUMENTS

2012/0230610 A1* 9/2012 Lee .................. G06F 17/30244
382/305

OTHER PUBLICATIONS

Zhao, Rui, Wanli Ouyang, and Xiaogang Wang. "Unsupervised salience learning for person re-identification." Computer Vision and Pattern Recognition (CVPR), 2013 IEEE Conference on. IEEE, 2013.*

Bedagkar-Gala, Apurva, and Shishir K. Shah. "A survey of approaches and trends in person re-identification." Image and Vision Computing 32.4 (2014): 270-286.*

Yi, Yang, and Deva, Ramanan. *Articulated Human Detection with Flexible Mixtures of Parts*, IEEE Transactions on Pattern Analysis and Machine Intelligence (PAMI), Dec. 2013. p. 1-15.

Felzenszwalb, Pedro F., et al. *Object Detection with Discriminatively Trained Part Based Models*, IEEE Transactions on Pattern Analysis and Machine Intelligence, Sep. 2010. pp. 1-20.

* cited by examiner

*Primary Examiner* — Andrew Moyer
(74) *Attorney, Agent, or Firm* — Farjami & Farjami LLP

(57) ABSTRACT

There is provided a system including a memory and a processor configured to receive a first image depicting a first object and a second image depicting a second object, divide the first image into a first plurality of patches and the second image into a second plurality of patches, extract plurality of feature vectors from each of the first plurality of patches and a second plurality of feature vectors from the second plurality of patches, determine dissimilarities based on a plurality of patch metrics, each patch dissimilarity measure being a dissimilarity between corresponding patches of the first plurality of patches and the second plurality of patches, compute an image dissimilarity between the first image and the second image based on an aggregate of the plurality of patch dissimilarity measures, evaluate the image dissimilarity to determine a probability of whether the first object and the second object are the same.

20 Claims, 9 Drawing Sheets

SYSTEMS AND METHODS FOR RE-IDENTIFYING OBJECTS IN IMAGES

BACKGROUND

Re-identifying individuals in images can be a difficult task, because many images are not taken with sufficiently high resolution to use facial recognition software. Conventional methods of re-identification depend on a comparison of a first total image to a second total image. Comparing the two total images, however, requires compressing image data for each image by one or more orders of magnitude, resulting in a significant loss of data and resolution. As a result, conventional methods are error prone and may return false negatives due to, among other things, differing conditions between the images being compared, such as different lighting and a change in pose of the individual.

SUMMARY

The present disclosure is directed to systems and methods for re-identifying objects in images, substantially as shown in and/or described in connection with at least one of the figures, as set forth more completely in the claims.

DETAILED DESCRIPTION

Figure 1:
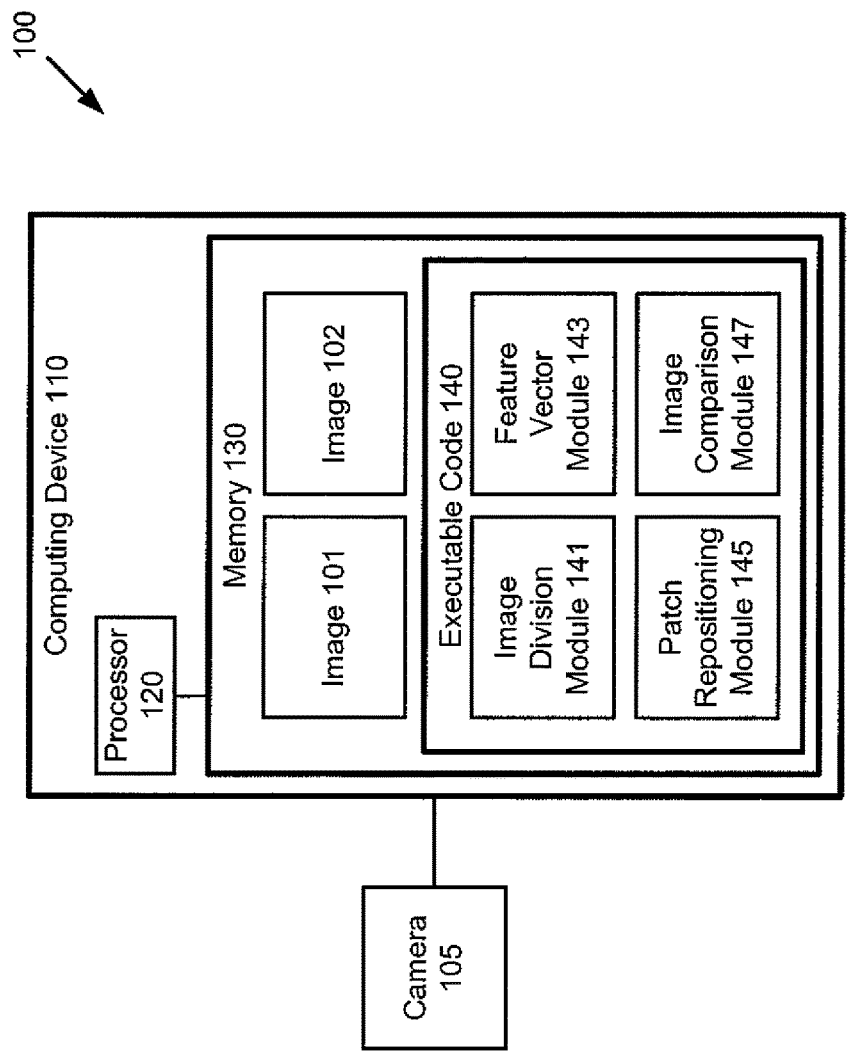
FIG. 1 shows a diagram of an exemplary system for re-identifying objects in images, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for re-identifying objects in images, according to one implementation of the present disclosure. Diagram 100 includes camera 105 and computing device 110. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140, image 101, and image 102.

Camera 105 may be a camera for capturing images, such as a security camera. In some implementations, camera 105 may be one camera, or may include two or more cameras positioned to capture images at different locations. For example, a first camera may be positioned to capture an image of individuals entering a building, such as an office building or a retail store, and a second camera may be positioned at a second location, such as near an elevator in the office building or near valuable merchandise in the retail store. In some implementations, camera 105 may capture image 101 and image 102 and transmit image 101 and image 102 to computing device 110.

Executable code 140 includes one or more software modules stored in memory 130 for execution by processor 120 of commuting device 110. As shown in FIG. 1, executable code 140 includes image partitioning module 141, feature vector module 143, patch repositioning module 145, and image comparison module 147. Image partitioning module 141 is a software module for execution by processor 120 to divide image 101 and/or image 102 into a plurality of patches, where a patch refers to a rectangular portion of the original image. Image partitioning module 141 may receive image 101 and/or image 102 from camera 105. In some implementations, image partitioning module 141 may divide image 101 and/or image 102 into a plurality of geometric patches, for example, rectangular patches. Dividing image 101 and image 102 into a corresponding plurality of patches may enable executable code 140 to compare image 101 and image 102 more efficiently.

Feature vector module 143 is a software module for execution by processor 120 to extract one or more feature vectors from each patch of image. In some implementations, each feature vector may include one or more metrics of the patch from which the feature vector is extracted. For example, feature vector module 143 may extract color information from each patch of image 101 and each patch of image 102, texture information from each patch of image 101 and each patch of image 102, etc.

Patch repositioning module 145 is a software module for execution by processor 120 to displace one or more patches of image 101. In some implementations, when image 101 and image 102 depict the same object, the position and/or location of the object may be different in image 102 than it is in image 101. For example, image 101 may depict an individual from a substantially frontal view point, taken as the individual faced camera 105. Image 102 may depict the same individual from an angle, such as 15 degrees, 30 degrees, etc., to the side of the individual, measured horizontally from the direction the individual is facing at the time image 102 is taken.

Image comparison module 147 is a software module for execution by processor 120 to determine whether image 101 and image 102 depict the same object. In some implementations, image comparison module 147 may compare the total image distance measure for image 101 with the total image distance measure for image 102. Based on the comparison, image comparison module 147 may determine that image 102 depicts the same object as image 101 if the aggregate image measures for image 101 and image 102 are similar, such as when there is a 20% variance, a 15% variance, a 10% variance, etc., between the two aggregate image measures.

Figure 2:
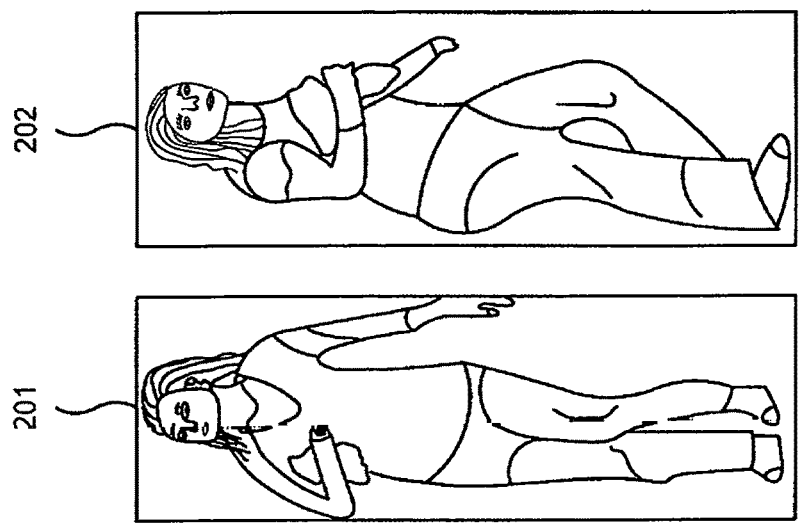
FIG. 2 shows a diagram of an exemplary pair of input images for use with the system of FIG. 1, according to one implementation of the present disclosure.
Figure 3:
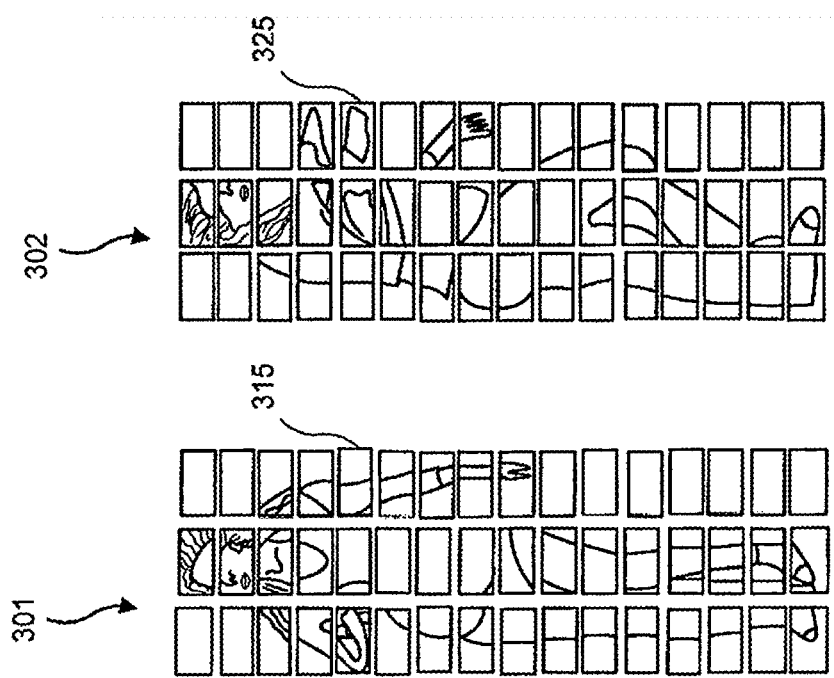
FIG. 3 shows a diagram of the images of FIG. 2 divided into patches for use with the system of FIG. 1, according to one implementation of the present disclosure.

FIG. 2 shows a diagram of an exemplary pair of input images for use with the system of FIG. 1, according to one implementation of the present disclosure. Image 201 depicts an individual facing the camera. Image 202 depicts the same individual at a different point in time and was captured from a different angle than image 201. FIG. 3 shows a diagram of the images of FIG. 2 divided into patches for use with the system of FIG. 1, according to one implementation of the present disclosure. As shown in FIG. 3, patch 315 and patch 325 occupy the same relative position in images 301 and 302, respectively. However, patch 315 includes a portion of the arm of the individual depicted and a portion of the background of the image, while patch 325 includes a portion of the hand of the individual depicted. Although patch 315 and patch 325 occupy the same relative position in images 301 and 302, patch 315 and patch 325 do not correspond to the same body part, because of a pose change. Information from such misaligned features might be lost when patches of the image are static.

Figure 4:
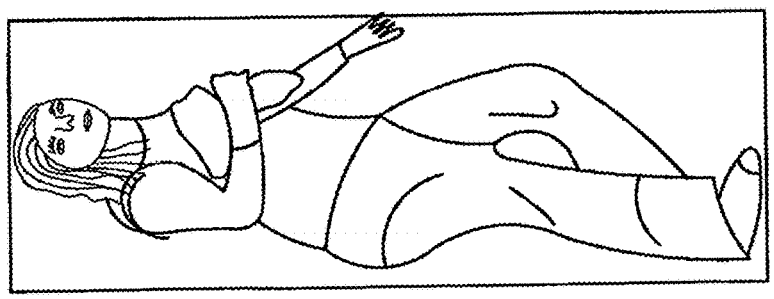
FIG. 4 shows a diagram of an exemplary comparison of the images of FIG. 2 using the system of FIG. 1, according to one implementation of the present disclosure.
Figure 4:
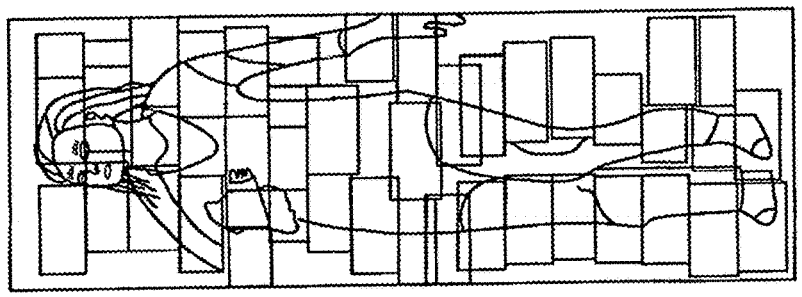

FIG. 4 shows a diagram of an exemplary comparison of the images of FIG. 2 using the system of FIG. 1, according to one implementation of the present disclosure. Image 401 shows the image 301 with the patches repositioned to more closely match the pose of the individual in image 402. In some implementations, patch repositioning module 145 may be trained on the deformation cost associated with each patch in image 401. For example, based on a set of training images, patch repositioning module 145 may learn that patches close to the head of an individual in an image may contain more background noise than patches close to the torso of the individual. Patch repositioning module 145 may learn a deformation cost for each patch in the image, and each patch may have a different deformation cost, allowing patch repositioning module 145 to deform the patches close to the head of the individual more than the patches close to the torso of the individual. As shown in FIG. 4, the patches of image 401 are repositioned to more closely match the pose of the individual in image 402, allowing image comparison module to determine whether image 401 and image 402 depict the same individual with greater accuracy.

Figure 5:
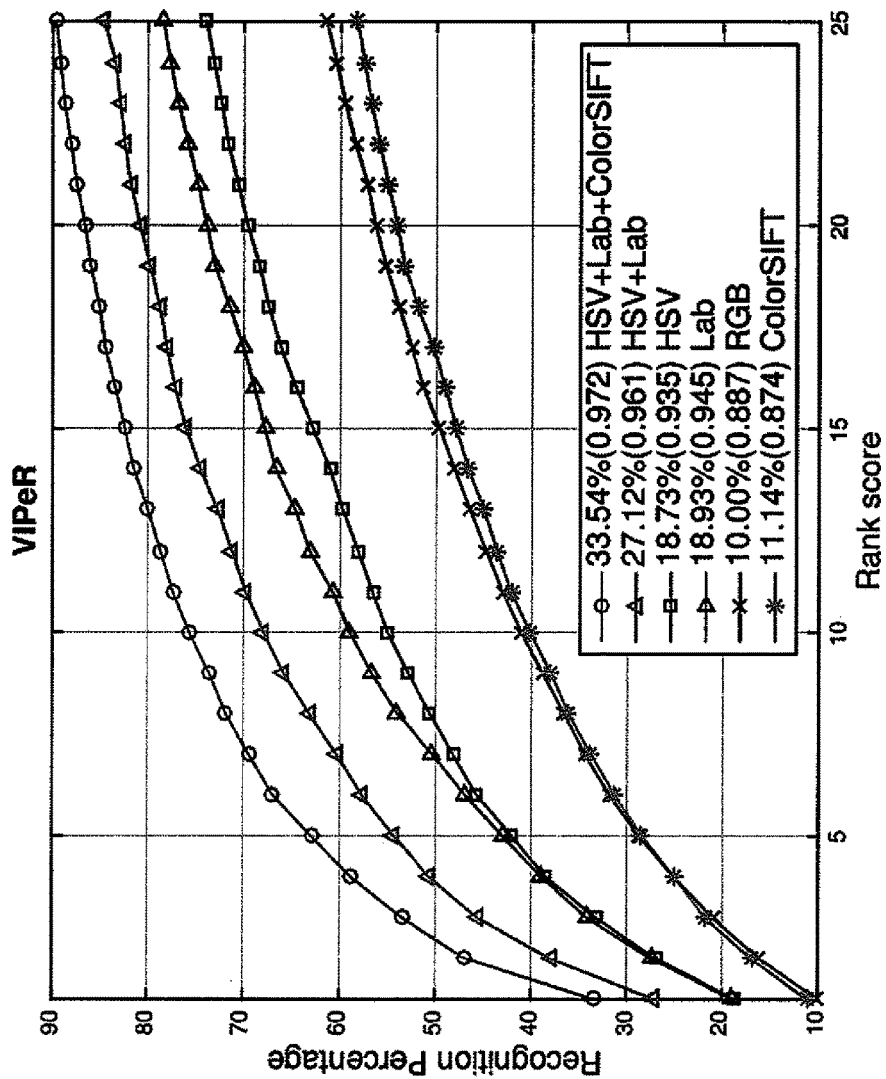
FIG. 5 shows a diagram of a chart showing efficacy of different analysis methods using the system of FIG. 1, according to one implementation of the present disclosure.

FIG. 5 shows a diagram of a chart showing efficacy of different analysis methods using the system of FIG. 1, according to one implementation of the present disclosure. It is common practice in person re-identification to combine color descriptors and texture descriptors for describing an image. Executable code 140 may evaluate different combinations of representations, including a Lab color space histogram, a red, green, blue (RGB) color space histogram, and a hue, saturation, value (HSV) color space histogram of the image. Lab color space may refer to a color-opponent space with dimension L for lightness and having a and b for the color-opponent dimensions, based on nonlinearly compressed coordinates, and HSV may be a cylindrical representation of RGB color space. Texture information may be captured by color scale invariant feature transform (SIFT), which is the SIFT descriptor extracted for each Lab channel and then concatenated. FIG. 5 illustrates the averaged cumulative matching characteristic (CMC) curves for VIPeR data set. As shown in FIG. 5, the most informative color space is Lab, and the best performance may be achieved when executable code 140 combines Lab, HSV and color SIFT.

Figure 6:
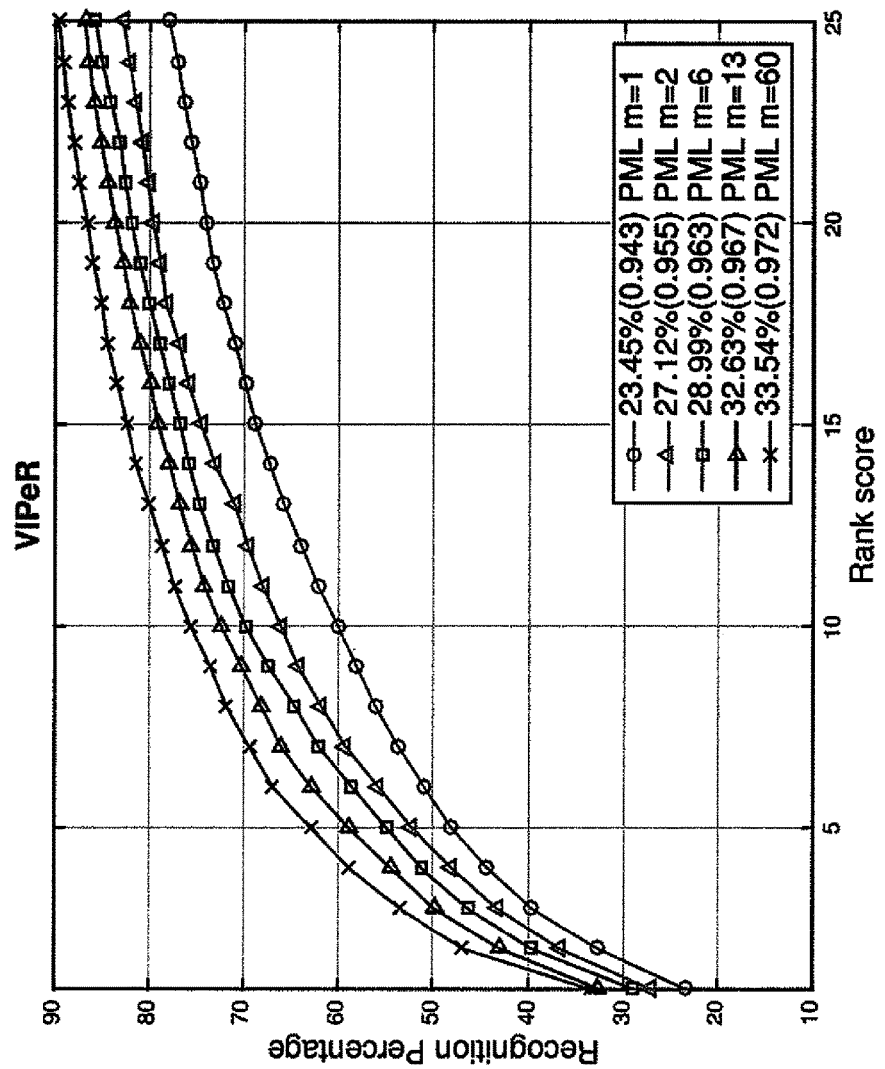
FIG. 6 shows a diagram of another chart showing efficacy of different analysis methods using the system of FIG. 1, according to one implementation of the present disclosure.

FIG. 6 shows a diagram of another chart showing efficacy of different analysis methods using the system of FIG. 1, according to one implementation of the present disclosure. In some implementations, executable code 140 may learn one metric (m) for all patch locations, or a plurality of metrics, such as one metric per patch location. Executable code 140 may begin by considering the two extremes for an image divided into sixty (60) patches. The first extreme is when executable code 140 learns sixty independent metrics (m=60), one metric for each patch location. On the other extreme, executable code 140 learns a single metric for all sixty patches (m=1). FIG. 6 shows a graph of the recognition percentage for images in the VIPeR dataset when analyzed using different numbers of metrics. The results indicate that multiple metrics lead to significantly better recognition accuracy, and the graph shows that the best performance is achieved with m=60. In some implementations, executable code 140 may learn a metric for a particular location k, and then apply the metric to compute dissimilarity measures for all other patch locations.

Figure 7:
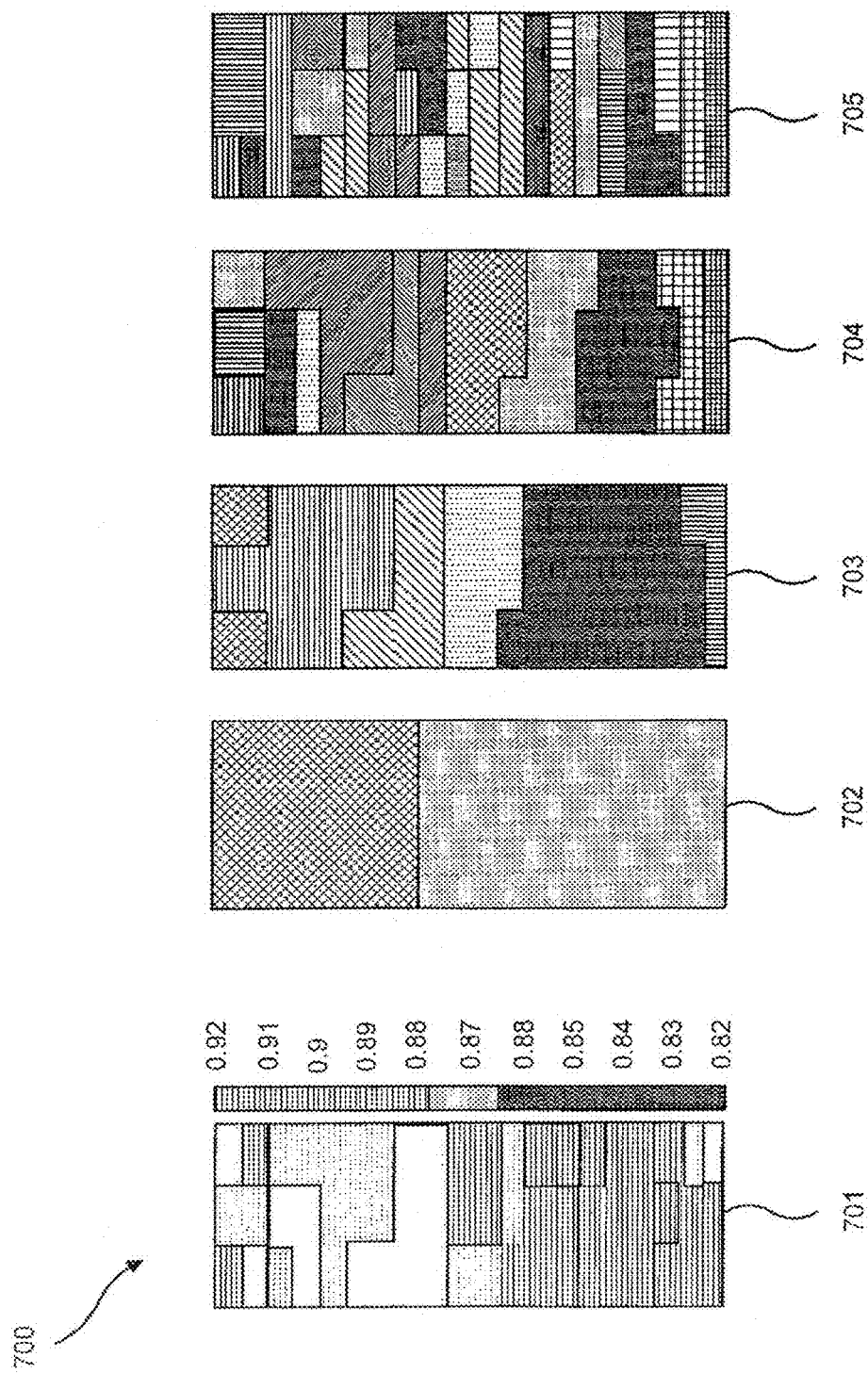
FIG. 7 shows a diagram of an exemplary dividing of an image into a various number of patches, according to one implementation of the present disclosure.

FIG. 7 shows a diagram of an exemplary dividing of an image into various numbers of patches, according to one implementation of the present disclosure. Executable code 140 may cluster patch locations spatially using hierarchical clustering, such as bottom-up, where the similarity between regions is computed using normalized area under the curve values. Plot 701 of FIG. 7 shows the normalized area under the curve values with respect to the location of the learned metric. Plots 702-706 of FIG. 7 show clustering results with respect to the number of clusters, metrics learned at different locations may yield different performances. Plot 702 shows the clustering results when m=2, plot 703 shows the clustering results when m=6, plot 704 shows the clustering results when m=13, and plot 705 shows the case when m=60. Next, executable code 140 may learn metrics for each cluster of patch locations. These metrics may be used to compute patch similarity in corresponding image regions. As shown in FIG. 6, the best performance was achieved with m=60. In some implementations, there may be sufficient data to train an independent metric for each patch location. Executable code 140 may test this hypothesis by reducing the amount of training data and evaluating the optimal number of patch metrics when fewer training examples are available. When a common metric is learned for multiple patch locations, the amount of training data may be effectively increased, because features from multiple patches can be used as examples for learning the same metric.

Figure 8:
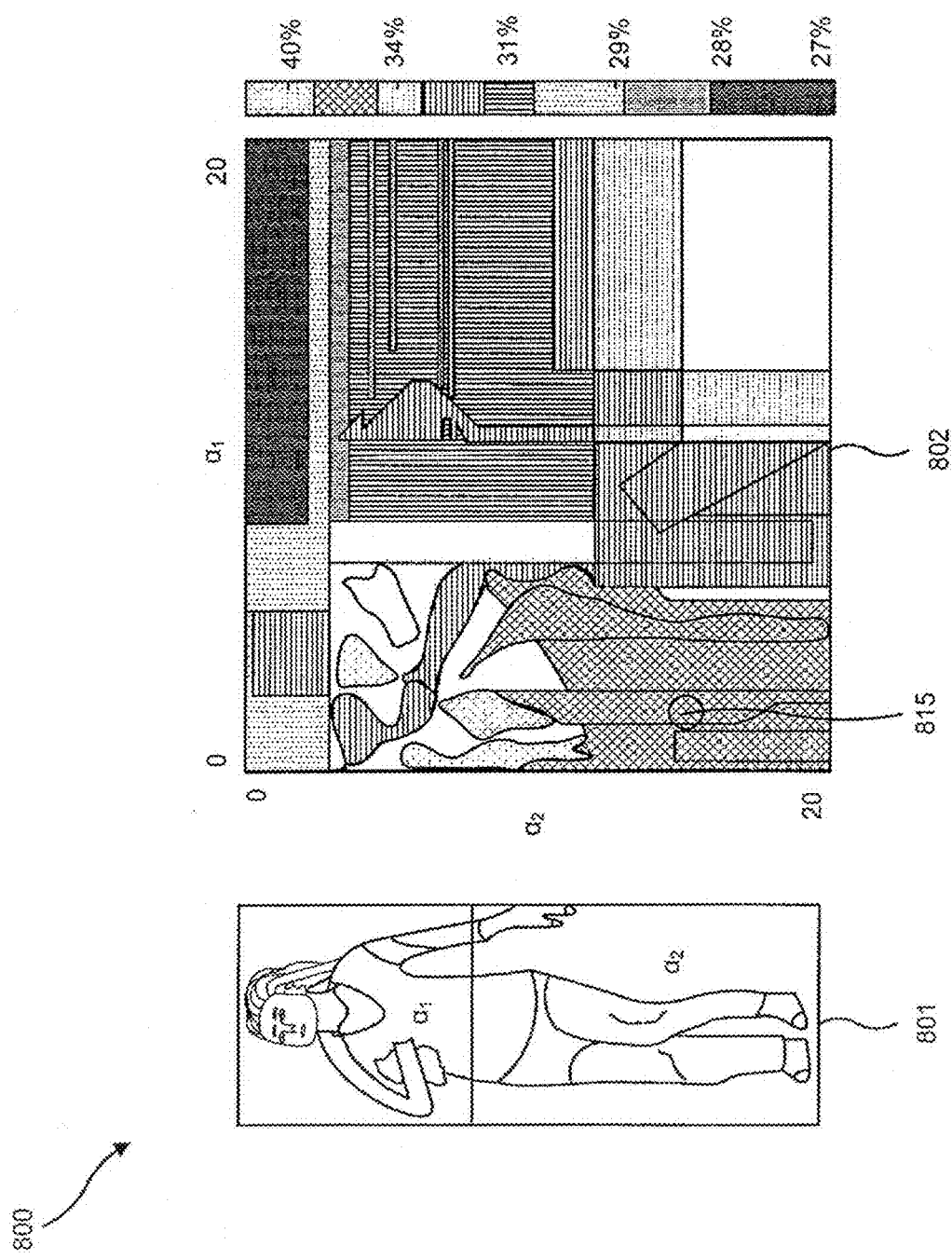
FIG. 8 shows a diagram of an exemplary image analysis, according to one implementation of the present disclosure.

FIG. 8 shows a diagram of an exemplary image analysis, according to one implementation of the present disclosure. In some implementations, executable code 140 may simplify the analysis of an image by restricting the number of unique spring constants. As shown in FIG. 8, image 801 is divided into two segments, $\alpha_1$ and $\alpha_2$ which may be obtained by hierarchical clustering. The parameters $\alpha_1$ and $\alpha_2$ are assigned to patch locations obtained by hierarchical clustering with the number of clusters m=2. Parameter $\alpha_k$ may encode the rigidity of the patches at particular locations. Executable code 140 may perform an exhaustive grid search iterating through $\alpha_1$ and $\alpha_2$ while maximizing Rank-1 recognition rate. Graph 802 illustrates the recognition rate map as a function of both coefficients. Location 815 in FIG. 8 represents the optimal operating point, where patches in the lower portion of image 801, corresponding to $\alpha_2$, have high spring constants and patches in the upper region of image 801, corresponding to $\alpha_1$, have low spring constants. This might be due to the fact that metrics learned on the lower locations have higher performance, as shown in plot 701 in FIG. 7.

Figure 9:
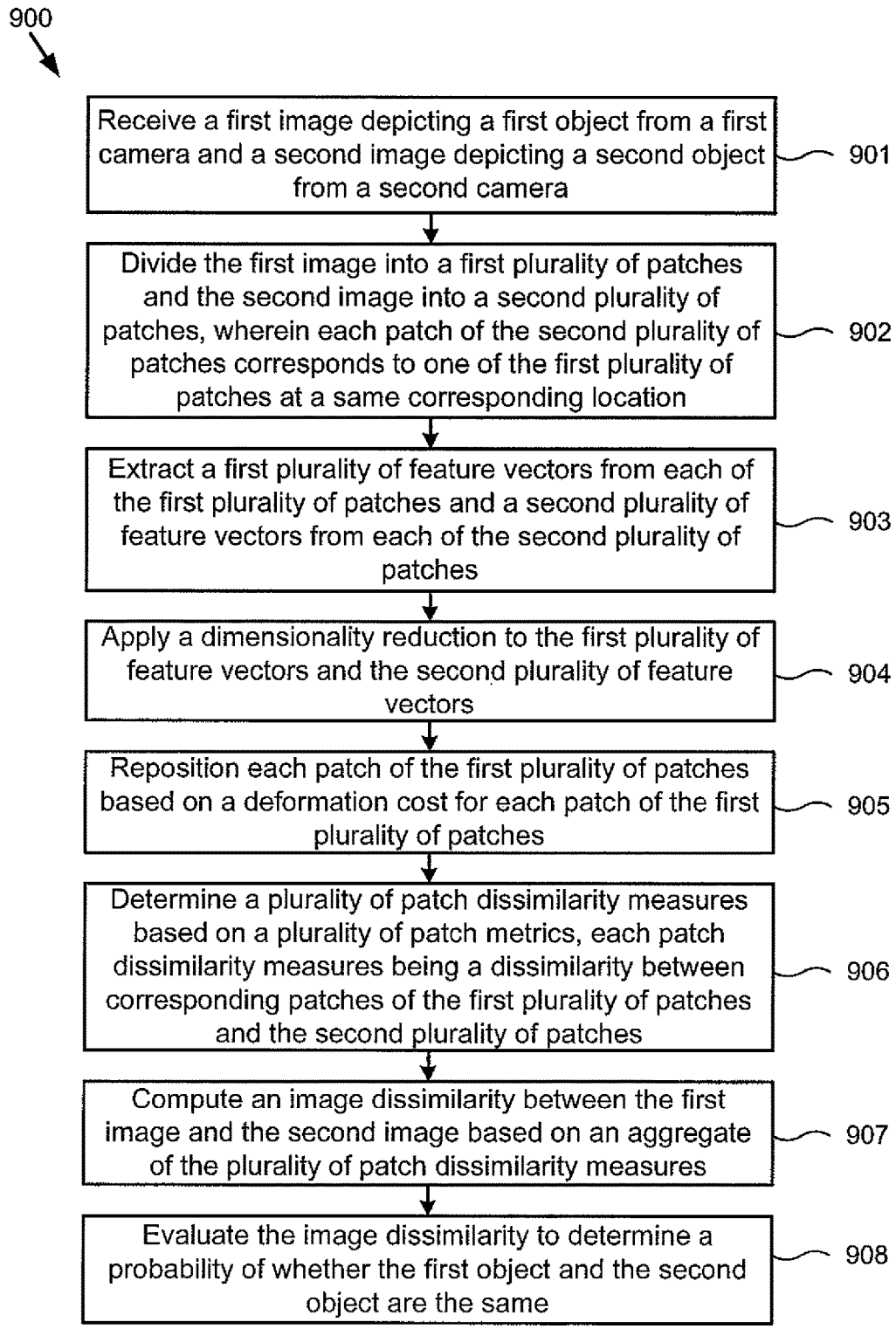
FIG. 9 shows a flowchart illustrating an exemplary method of re-identifying objects in images, according to one implementation of the present disclosure.

FIG. 9 shows a flowchart illustrating an exemplary method of re-identifying objects in images, according to one implementation of the present disclosure. Method 900 begins at 901, where executable code 140 receives a first image depicting a first object from a first camera and a second image depicting a second object from a second camera. In some implementations, the first camera may be the same camera as the second camera, or the first camera may be a different camera than the second camera. Method 900 continues at 902, where executable code 140 divides the first image into a first plurality of patches and the second image into a second plurality of patches wherein each patch of the second plurality of patches corresponds to one of the first plurality of patches at a same location. For example, image partitioning module 141 may divide the first image into a dense grid with overlapping rectangular patches, and second image into a dense grid with corresponding overlapping rectangular patches.

At 903, executable code 140 extracts a first plurality of feature vectors from each of the first plurality of patches and a second plurality of feature vectors from each of the second plurality of patches. From each patch location k, feature vector module 143 may extract color descriptors and texture descriptors, such as color, gradient histogram, etc. In some implementations, feature vector module 143 may concatenate the extracted color descriptors and texture descriptors into the patch feature vector $p_i^k$. Executable code 140 may represent the first image i as an ordered set of patch features $X_i = \{p_i^1, p_i^2, \ldots, p_i^K\}$ and the second image j as an ordered set of patch features $X_j = \{p_j^1, p_j^2, \ldots, p_j^K\}$, where K is the number of patches. In some implementations, executable code 140 may learn a dissimilarity function for feature vectors extracted from patches. Executable code 140 may define the dissimilarity measure as:

$$\Phi(p_i^k - p_j^k) = (p_i^k - p_j^k)^T M^{(k)} (p_i^k - p_j^k), \quad (2)$$

where $p_i^k$ and $p_j^k$ are the feature vectors extracted from patches at location k in the first image i and the corresponding location k in the second image j. In some implementations, a single metric (M) could be learned for all patch locations. Regions with statistically different amounts of background noise should have different metrics. For example, when camera 105 is used to capture images of individuals, patches close to the head of an individual may contain more background noise than patches close to the torso of the individual. In some implementations, recognition performance may be a function of available training data, which may limit the number of patch metrics that executable code 140 can learn efficiently.

To learn $M^{(k)}$ on the first image i and the second image j, executable code 140 may introduce the space of pair-wise differences, $p_{ij}^k = p_i^k - p_j^k$, and partition the training data into $p_{ij}^{k+}$ when i and j are images containing the same object, and $p_{ij}^{k-}$ otherwise. Note that for learning, executable code 140 may use differences on patches from the same location k. Executable code 140 may assume a zero mean Gaussian structure on difference space and employ a log likelihood ratio test, resulting in:

$$M^{(k)} = \Sigma_{k+}^{-1} - \Sigma_{k-}^{-1} \quad (3)$$

where $\Sigma_{k+}$ and $\Sigma_{k-}$ are the covariance matrices of $p_{ij}^{k+}$ and $p_{ij}^{k-}$, respectively:

$$\Sigma_{k+} = \Sigma (p_{ij}^{k+})(p_{ij}^{k+})^T, \quad (4)$$

$$\Sigma_{k-} = \Sigma (p_{ij}^{k-})(p_{ij}^{k-})^T. \quad (5)$$

To compute the dissimilarity between the first image i and the second image j, executable code 140 may combine patch dissimilarity measures by summing over all patches $\Sigma_{k=1}^K \Phi(p_i^k, p_j^k)$, which may be represented as a block diagonal matrix:

$$[p_{ij}^1, p_{ij}^2, \ldots, p_{ij}^K] \begin{bmatrix} M^1 & 0 & K & 0 \\ 0 & M^2 & K & 0 \\ M & M & O & 0 \\ 0 & 0 & K & M^K \end{bmatrix} \begin{bmatrix} p_{ij}^1 \\ p_{ij}^2 \\ M \\ p_{ij}^K \end{bmatrix} \quad (7)$$

where all $M^{(k)}$ are learned independently or through spatial clusters. This approach may be referred to as patch-based metric learning (PML).

At 904, executable code 140 applies a dimensionality reduction to the first plurality of feature vectors and the second plurality of feature vectors. For example, executable code 140 may apply a principle component analysis, or other appropriate compression methods. Method 900 continues at 905, where executable code 140 repositions each patch of the first plurality of patches based on a deformation cost for each patch of the first plurality of patches. In some implementations, executable code 140 may learn a deformation cost for each of the first plurality of patches. Pose changes and different camera viewpoints make re-identification more difficult. To overcome this issue, executable code 140 may deform the first image by repositioning patches in the first image when matching to the second image. In some implementations, executable code 140 may approximate continuous non-affine warps by translating 2D templates. In some implementations, patch repositioning module 145 may use a spring model to limit the displacement of patches in the first image. The deformable dissimilarity measure for matching the patch at location k in the first image with the second image may be defined as:

$$\Psi(p_i^k, j) = \min_l [\Phi(p_i^k, p_j^l) + \alpha_k \Delta(k, l)], \quad (8)$$

where patch feature $p_j^l$ is extracted from the second image j at location l. The appearance term $\Phi(p_i^k, p_j^l)$ may compute the feature dissimilarity between patches and may be learned in the same manner as learning $M^{(k)}$ described above. The deformation cost $\alpha_k \Delta(k,l)$ may refer to a spring model that controls the relative placement of patches k and l. $\Delta(k,l)$ is the squared distance between the patch locations. $\alpha_k$ encodes the rigidity of the spring: $\alpha_k = \infty$ corresponds to a rigid model, while $\alpha_k = 0$ allows a patch to change its location freely.

Executable code 140 may combine the deformable dissimilarity measures $\Psi(p_i^k, j)$ into a unified dissimilarity measure:

$$\Psi(i, j) = \sum_{k=1}^K w_k \psi(p_i^k, j) = \langle w, \psi_{ij} \rangle, \quad (9)$$

where w is a vector of weights and $\psi_{ij}$ corresponds to a vector of patch dissimilarity measures.

To learn $\alpha_k$ and w, patch repositioning module 145 may define the optimization problem as a relative distance comparison of triplets {i,j,z} such that $\Psi(i,z) > \Psi(i,j)$ for all i,j,z, where i and j correspond to images containing the same person, and i and z are images from different images containing different people. In some implementations, patch repositioning module 145 may use a limited number of unique spring constants $\alpha_k$ and apply two-step optimization. First, patch repositioning module 145 may optimize k with w=1, by performing exhaustive grid search while maximizing Rank-1 recognition rate. Second, patch repositioning module 145 may fix $\alpha_k$ and determine the best w using structural support vector machines (SVMs). This approach may be referred to as deformable model metric learning (DPML). In some implementations, patch repositioning module 145 may simplify equation (8) by restricting the number of unique spring constants. Two parameters, $\alpha_1$ and $\alpha_2$, may be assigned to patch locations obtained by hierarchical clustering with the number of clusters m=2, as shown in FIG. 8. Parameter $\alpha_k$ encodes the rigidity of the patches at particular locations. Executable code 140 may perform an exhaustive grid search iterating through $\alpha_1$ and $\alpha_2$ while maximizing Rank-1 recognition rate.

At 906, executable code 140 determines a plurality of patch dissimilarity measures based on a plurality of patch metrics, each patch dissimilarity measure being a dissimilarity between corresponding patches of the first plurality of patches and the second plurality of patches. In some implementations, executable code 140 may learn a metric for each patch locations in the grid of patches. In some implementations, the metric learning may be based on a plurality of training images, such as the VIPeR dataset, the i-LIDS dataset, the CUHK01 dataset, etc. The VIPeR dataset is one of the most popular person re-identification datasets. It contains 632 image pairs of pedestrians captured by two outdoor cameras. VIPeR images contain large variations in lighting conditions, background, viewpoint, and image quality. The i-LIDS has 119 individuals with 476 images. This dataset is very challenging because it includes many occlusions. Often only the top part of the individual is visible, and usually there is a significant scale or viewpoint change. The CUHK01 dataset contains 971 persons captured with two cameras. For each person, 2 images for each camera are provided. The images in this dataset are better quality and higher resolution than the images in the VIPeR dataset and the i-LIDS dataset.

At 907, executable code 140 computes an image dissimilarity between the first image and the second image based on an aggregate of the plurality of patch dissimilarity measures. In some implementations, the image dissimilarity may be calculated between the first image and a plurality of candidate images. The image dissimilarity may be calculated by adding together the plurality of patch dissimilarity measures between two images. Method 900 continues at 908, where executable code 140 evaluates the image dissimilarity to determine a probability of whether the first object and the second object are the same. In some implementations, the image dissimilarity may be used for ranking image candidates to determine if some two images contain the same object. Image comparison module 147 may determine whether the first image and the second image depict the same object based on the image dissimilarity.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system comprising a non-transitory memory and a hardware processor, the method comprising:
   receiving, using the hardware processor, a first image depicting a first object and a second image depicting a second object;
   dividing, using the hardware processor, the first image into a first plurality of patches and the second image into a second plurality of patches;
   extracting, using the hardware processor, a first plurality of feature vectors from each of the first plurality of patches and a second plurality of feature vectors from each of the second plurality of patches;
   repositioning, using the hardware processor, each patch of the first plurality of patches based on a deformation cost for each patch of the first plurality of patches;
   determining, using the hardware processor, a plurality of patch dissimilarity measures based on a plurality of patch metrics, each patch dissimilarity measure being a dissimilarity between corresponding patches of the repositioned first plurality of patches and the second plurality of patches;
   computing, using the hardware processor, an image dissimilarity between the first image and the second image based on an aggregate of the plurality of patch dissimilarity measures; and
   evaluating, using the hardware processor, the image dissimilarity to determine a probability of whether the first object and the second object are the same.

2. The method of claim 1, wherein the deformation cost is different for each patch of the first plurality of patches.

3. The method of claim 1, wherein the first plurality of feature vectors and the second plurality of feature vectors each include a plurality of descriptors.

4. The method of claim 3, wherein the plurality of descriptors includes a color descriptor and a texture descriptor.

5. The method of claim 4, wherein the color descriptor is one of a red, green, blue (RGB) color descriptor, a Lab color descriptor, and a hue, saturation, value (HSV) color descriptor.

6. The method of claim 4, wherein the texture descriptor is a color scale invariant feature transform (SIFT) descriptor.

7. The method of claim 1, wherein, prior to determining the dissimilarity measure, the method further comprises:
   applying, using the hardware processor, a dimensionality reduction to the first plurality of feature vectors and the second plurality of feature vectors.

8. The method of claim 1, wherein the first image is obtained from a first camera and the second image is obtained from a second camera.

9. The method of claim 1, wherein the first object is a person.

10. The method of claim 1, wherein the first plurality of patches and the second plurality of patches occupy the same relative positions in the first image and the second image.

11. A system comprising:
   a non-transitory memory storing an executable code; and
   a hardware processor executing the executable code to:

receive a first image depicting a first object and a second image depicting a second object;

divide the first image into a first plurality of patches and the second image into a second plurality of patches;

extract a first plurality of feature vectors from each of the first plurality of patches and a second plurality of feature vectors from each of the second plurality of patches;

reposition each patch of the first plurality of patches based on a deformation cost for each patch of the first plurality of patches;

determine a plurality of patch dissimilarity measures based on a plurality of patch metrics, each patch dissimilarity measure being a dissimilarity between corresponding patches of the repositioned first plurality of patches and the second plurality of patches;

compute an image dissimilarity between the first image and the second image based on an aggregate of the plurality of patch dissimilarity measures; and evaluate the image dissimilarity to determine a probability of whether the first object and the second object are the same.

12. The system of claim 11, wherein the deformation cost is different for each patch of the first plurality of patches.

13. The system of claim 11, wherein the first plurality of feature vectors and the second plurality of feature vectors each include a plurality of descriptors.

14. The system of claim 13, wherein the plurality of descriptors includes a color descriptor and a texture descriptor.

15. The system of claim 14, wherein the color descriptor is one of a red, green, blue (RGB) color descriptor, a Lab color descriptor, and a hue, saturation, value (HSV) color descriptor.

16. The system of claim 14, wherein the texture descriptor is a color scale invariant feature transform (SIFT) descriptor.

17. The system of claim 11, wherein, prior to determining the dissimilarity measure, the hardware processor further executes the executable code to:

apply a dimensionality reduction to the first plurality of feature vectors and the second plurality of feature vectors.

18. The system of claim 11, wherein the first image is obtained from a first camera and the second image is obtained from a second camera.

19. The system of claim 11, wherein the first object is a person.

20. The system of claim 11, wherein the first plurality of patches and the second plurality of patches occupy the same relative positions in the first image and the second image.

* * * * *